(12) United States Patent
Monnier et al.

(10) Patent No.: US 9,895,828 B2
(45) Date of Patent: Feb. 20, 2018

(54) VEHICLE INTERIOR PANEL FOR COVERING AN AIRBAG AND MANUFACTURING METHOD

(71) Applicant: Faurecia Innenraum Systeme GmbH, Hagenbach (DE)

(72) Inventors: Gwenael Monnier, Mareil sur Mauldre (FR); Jérôme Boulbes, Schleithal (FR); Thierry Schupbach, St. Crépin Ibouvilliers (FR); Fabrice Pepin, Beauvais (FR); Yohann Boniface, Senantes (FR); Richard Guenin, Villeneuve les Sablons (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 15/152,188

(22) Filed: May 11, 2016

(65) Prior Publication Data

US 2016/0332590 A1   Nov. 17, 2016

(30) Foreign Application Priority Data

May 12, 2015   (DE) .......................... 10 2015 208 823

(51) Int. Cl.
*B29C 33/38*   (2006.01)
*B60R 21/215*   (2011.01)
(Continued)

(52) U.S. Cl.
CPC .......... *B29C 33/3842* (2013.01); *B29C 44/12* (2013.01); *B29C 45/1657* (2013.01);
(Continued)

(58) Field of Classification Search
CPC . B60R 21/215; B60R 21/20; B29C 66/73161; B29C 2045/166;
(Continued)

(56) References Cited

U.S. PATENT DOCUMENTS

| | | | | |
|---|---|---|---|---|
| 5,316,822 A | * | 5/1994 | Nishijima | ........... B29C 37/0057 156/244.25 |
| 5,335,935 A | * | 8/1994 | Proos | ................... B29C 37/0057 280/728.3 |

(Continued)

FOREIGN PATENT DOCUMENTS

DE   102014010860 A1   2/2015

*Primary Examiner* — Paul N Dickson
*Assistant Examiner* — Timothy Wilhelm
(74) *Attorney, Agent, or Firm* — Faegre Baker Daniels LLP

(57) ABSTRACT

The disclosure discloses a vehicle interior panel for covering an airbag and a method of fabricating a vehicle interior panel for covering an airbag. The vehicle interior panel includes a substrate with an opening, a chute channel assembly inserted into the opening, a surface skin, and a foam layer disposed between the surface skin and the substrate. The chute channel assembly includes a wall section surrounding a chute channel for the airbag and a cover plate covering the chute channel and closing the opening. The cover plate includes an airbag door, wherein an outer surface of the cover plate is in contact with the foam layer. The outer surface of the cover plate has a rough surface structure, the outer surface having a surface roughness parameter $R_a$ of at least 4 μm.

12 Claims, 2 Drawing Sheets

(51) Int. Cl.
  *B60R 21/2165* (2011.01)
  *B29C 45/16* (2006.01)
  *B29C 44/12* (2006.01)
  *B29K 105/04* (2006.01)
  *B29L 31/30* (2006.01)
  *B29C 45/37* (2006.01)
  *B29C 33/42* (2006.01)

(52) U.S. Cl.
  CPC ........ *B29C 45/1676* (2013.01); *B60R 21/215* (2013.01); *B60R 21/2165* (2013.01); *B29C 33/424* (2013.01); *B29C 45/372* (2013.01); *B29C 2045/166* (2013.01); *B29K 2105/04* (2013.01); *B29L 2031/3038* (2013.01); *B60Y 2410/122* (2013.01)

(58) Field of Classification Search
  CPC ...... B29C 45/14467; B29C 2045/1454; B29C 2045/1673; B29C 45/1671; B29C 45/1615; B29C 45/7207; B29C 33/3842; B29K 2105/04; B29K 2075/00; B29K 2623/16; B29K 2023/12; B29K 2023/16; B29K 2105/253; B29K 2623/06; B29K 2623/12; B29K 2023/06; B60Y 2410/122; B29L 2031/3038
  See application file for complete search history.

(56) References Cited

U.S. PATENT DOCUMENTS

| | | | |
|---|---|---|---|
| 5,728,328 A * | 3/1998 | Senda | B29C 33/56 249/114.1 |
| 6,348,172 B1 * | 2/2002 | Barnes | B29C 37/0057 264/299 |
| 6,905,643 B2 * | 6/2005 | Junker | B29C 45/14065 264/250 |
| 8,480,121 B2 * | 7/2013 | Horibe | B60R 21/205 280/728.3 |
| 2005/0104346 A1 * | 5/2005 | Suwama | B29C 45/1671 280/732 |
| 2006/0284401 A1 * | 12/2006 | Yamada | B60R 21/2165 280/728.3 |
| 2013/0249196 A1 * | 9/2013 | Fischer | B60R 21/215 280/728.3 |

* cited by examiner

VEHICLE INTERIOR PANEL FOR COVERING AN AIRBAG AND MANUFACTURING METHOD

CROSS-REFERENCE TO RELATED APPLICATION

This application claims priority to German Application No. 10 2015 208 823.5, filed May 12, 2015, which is herein incorporated by reference in its entirety.

BACKGROUND

This disclosure relates to a vehicle interior panel for covering an airbag. Furthermore, the disclosure relates to a method for manufacturing a vehicle interior panel for covering an airbag.

It is known to provide foam-in-place interior panels having integrated airbag doors. For example, DE 10 2014 010 860 A1 discloses an interior panel comprising a substrate, an airbag chute-door assembly mounted to the substrate, a surface skin, and a foam disposed between the surface skin and the substrate, wherein the chute-door assembly comprises a door flap portion provided with a pre-weakening to facilitate clean airbag deployment.

However, opening of the airbag door during deployment of the airbag can lead to a substantial fragmentation of the foam. In particular, a rapid acceleration of the door flap portion can catapult fragments of foam into the interior space of the vehicle posing a safety hazard for a passenger.

SUMMARY

In view of the above, this disclosure discloses an improved vehicle interior panel for covering an airbag and an associated method of fabrication. The disclosure discloses an interior panel which improves the safety of passengers travelling in a motor vehicle in the event of an airbag shot.

The present disclosure includes a vehicle interior panel for covering an airbag. The vehicle interior panel comprises a substrate with an opening, a chute channel assembly inserted into the opening, a surface skin, and a foam layer disposed between the surface skin and the substrate. The chute channel assembly comprises a wall section surrounding a chute channel for the airbag and a cover plate covering the chute channel and closing the opening. Further, the cover plate comprises an airbag door, wherein an outer surface of the cover plate is in contact with the foam layer. In addition, the outer surface of the cover plate has a rough surface structure, the outer surface having a roughness parameter $R_a$ of at least 4 µm. In some embodiments, the rough surface structure covers all parts of the chute channel assembly that are in contact with the foam layer or at least the whole airbag door.

The surface skin may form the topmost layer of the interior panel so that it is visible from the passenger cabin of the motor vehicle. The wall section is designed to direct the passage of the airbag through the chute channel towards the airbag door during airbag deployment. The cover plate and/or the foam layer and/or the surface skin may be weakened along an edge and/or a seam of the airbag door to make sure that the airbag door opens in the event of an airbag deployment.

The surface roughness parameter $R_a$ is to be understood in the conventional way. To determine $R_a$, a series of sufficiently narrowly spaced measurement values are obtained for a height of points on the outer surface along an arbitrary profile line across the outer surface. Then, the surface roughness parameter $R_a$ is defined as an arithmetic average of the distances between the measurement values and corresponding points on a mean line of the profile line, said distances being measured in a direction orthogonal to said mean line. The mean line may exhibit a curvature on a much larger lateral scale than the variation in height corresponding to the surface roughness. In some embodiments, the overall curvature of the mean line is convex as viewed from the passenger cabin.

The rough surface structure leads to a significantly increased adhesion between the foam layer and the outer surface of the cover plate. The increased adhesion is beneficial when the airbag door opens upon airbag deployment. First, the increased adhesion enables a cleaner tearing of the foam layer, so that a smaller amount of fragments is produced. Second, the increased adhesion prevents the fragments from being launched into passenger space due to a rapid acceleration of the cover plate.

In some embodiments, the chute channel assembly is a one-piece injection molded part. In this case, the wall section and the cover plate are manufactured in a single process step.

The chute channel assembly may be made of a thermoplastic material such as a material containing polypropylene and/or polyethylene and/or a copolymer containing propylene and/or ethylene units.

It may be useful that the material of the chute channel assembly contains EPDM (ethylene propylene diene monomer) as an additive to make the cover plate more elastic, especially at low temperatures. This may prevent the airbag door from breaking in an uncontrolled way in the event of an airbag shot.

In some embodiments, the surface roughness parameter $R_a$ of the outer surface of the cover plate is at least 6 µm and/or at most 13 µm. A surface roughness parameter $R_a$ between 6 and 13 µm is found to yield a desired improvement in adhesion between the foam layer and the outer surface of the cover plate. A surface roughness parameter $R_a$ of 6 µm corresponds to a significantly rougher surface as compared to the surface of an injection molded part for vehicle interior applications, which is not intentionally roughened.

The rough surface structure of the outer surface of the cover plate can have a maximal amplitude of at least 300 µm and/or at most 700 µm. The maximal amplitude is defined to be determined after sufficiently narrowly spaced measurement values are obtained for the height of points on the outer surface along the profile line across the outer surface, the height again being defined with respect to a mean line. The maximal amplitude is defined as the largest difference between measurement values thus obtained. Thus, the maximal amplitude corresponds to a difference in height between a maximal peak height and a deepest valley. Of course, the rough surface structure does not need to be and usually will not be periodic.

In some embodiments, the outer surface of the cover plate has a mean spacing between peaks of at least 100 µm and/or at most 800 µm. Here, a definition of a peak demands that the measurement values fall below the mean line between neighboring peaks.

The foam layer is preferably made of polyurethane. This material is widely used for foam-in-place interior panels.

The present disclosure further discloses a method for manufacturing a vehicle interior panel for covering an airbag. The method comprises the step of providing a first mold with an interior surface. Then, the interior surface is roughened to form a rough surface structure. Afterwards, a chute channel assembly is manufactured by injection molding using the first mold. The chute channel assembly comprises a wall section surrounding a chute channel and a cover plate covering the chute channel. During the manufacturing of the chute channel assembly, the rough surface structure of the interior surface of the mold forms a rough surface structure of an outer surface of the cover plate. Furthermore, a pre-molded substrate with an opening is provided. The chute channel assembly is inserted into the opening so that the cover plate closes the opening. A surface skin and the substrate with the chute channel assembly are placed in a second mold. Finally, a foam material is injected into the second mold to fill a space between the surface skin and the substrate with the chute channel assembly.

In this way a foam layer is formed, which contacts the outer surface of the cover plate and firmly connects the surface skin to the substrate and the chute channel assembly. Due to the rough surface structure of the outer surface, the suggested manufacturing method is well-suited to yield a vehicle interior panel with an improved adhesion between the outer surface of the cover plate and the foam layer.

The roughening of the interior surface may, for example, be achieved by sand blasting or etching.

The method may further comprise a step of flaming, wherein heat is applied to the outer surface of the cover plate prior to the injection of the foam material. The flaming leads to an increase of the surface tension of the outer surface of the cover plate. In this way, an increase in adhesion between the outer surface of the cover plate and the foam layer of the instrument panel can be achieved. In some embodiments, a treatment of the outer surface of the cover plate by flaming is performed in such a way that it leaves the rough structure of the outer surface unchanged.

The method described her may, in particular, be used for manufacturing a vehicle interior panel as described further above or, in more detail, here below.

BRIEF DESCRIPTION OF THE DRAWINGS

In the following, embodiments of the disclosure will be described in conjunction with the following figures.

DETAILED DESCRIPTION

Figure 1:
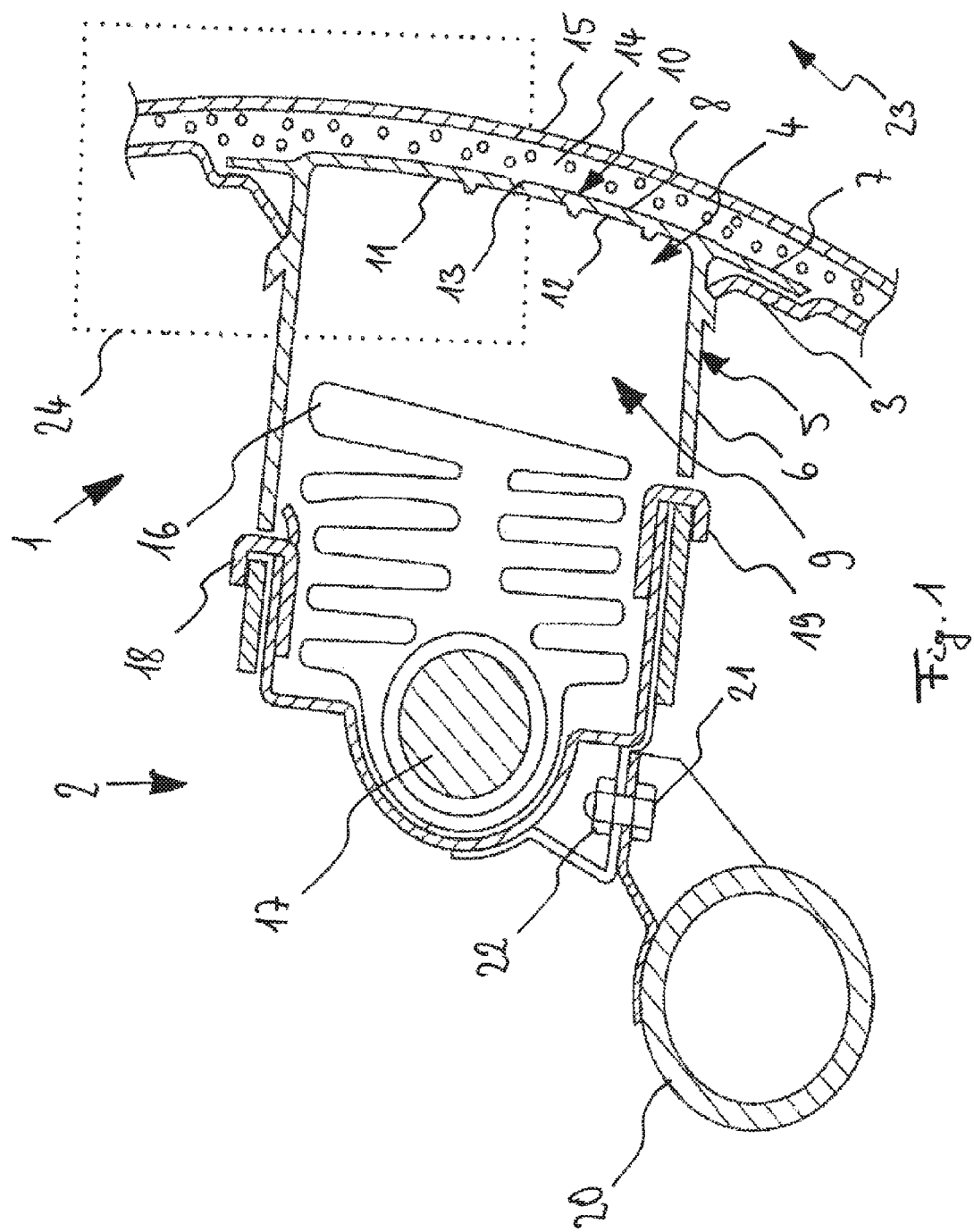
FIG. 1 is a sectional view of a vehicle interior panel and an airbag assembly in accordance with embodiments of the disclosure.

FIG. 1 is a diagram illustrating a vehicle interior panel 1 and an airbag assembly 2, according to embodiments of the disclosure. The vehicle interior panel 1 is an instrument panel positioned in front of a passenger seat in a motor vehicle. The vehicle interior panel 1 comprises a substrate 3 with an opening 4 and a chute channel assembly 5, which is inserted into the opening 4. The chute channel assembly 5 is a one-piece injection molded part and comprises a wall section 6 and a cover plate 7 with an outer surface 8. A chute channel 9 is surrounded by the wall section 6 and the cover plate 7. The cover plate 7 closes the opening 4 of the substrate 3 and comprises an airbag door 10 with a first door flap portion 11 and a second door flap portion 12. The door flap portions 11 and 12 are connected via a seam 13.

The substrate 3 and the cover plate 7 are covered by a foam layer 14 made of polyurethane and a surface skin 15. The surface skin 15 faces toward the passenger seat of the motor vehicle.

The airbag assembly 2 comprises a deployable airbag 16, an inflator 17, and hooks 18 and 19 connecting the airbag assembly 2 with the chute channel assembly 5. The airbag assembly 2 is attached to a cross member 20 of the vehicle using a bolt 21 and a nut 22.

The chute channel 9 accommodates the airbag 16 in a folded state. The wall section 6 is designed to guide the airbag 16 toward the airbag door 10 when the airbag 16 is deployed. The airbag door 10 opens when the door flap portions 11 and 12 part along the seam 13 as the airbag 16 hits the door flap portions 11 and 12. Furthermore, upon deployment of the airbag 16 the foam layer 14 and the surface skin 15 tear in an area in proximity to the seam 13. The surface skin 15 and/or the foam layer may also be pre-weakened to tear along a weakened line during airbag 16 deployment. After tearing of the seam 13, the foam layer 14, and the surface skin 15, the airbag 16 is permitted to fully unfold and inflate in a passenger space 23 of the motor vehicle.

Figure 2:
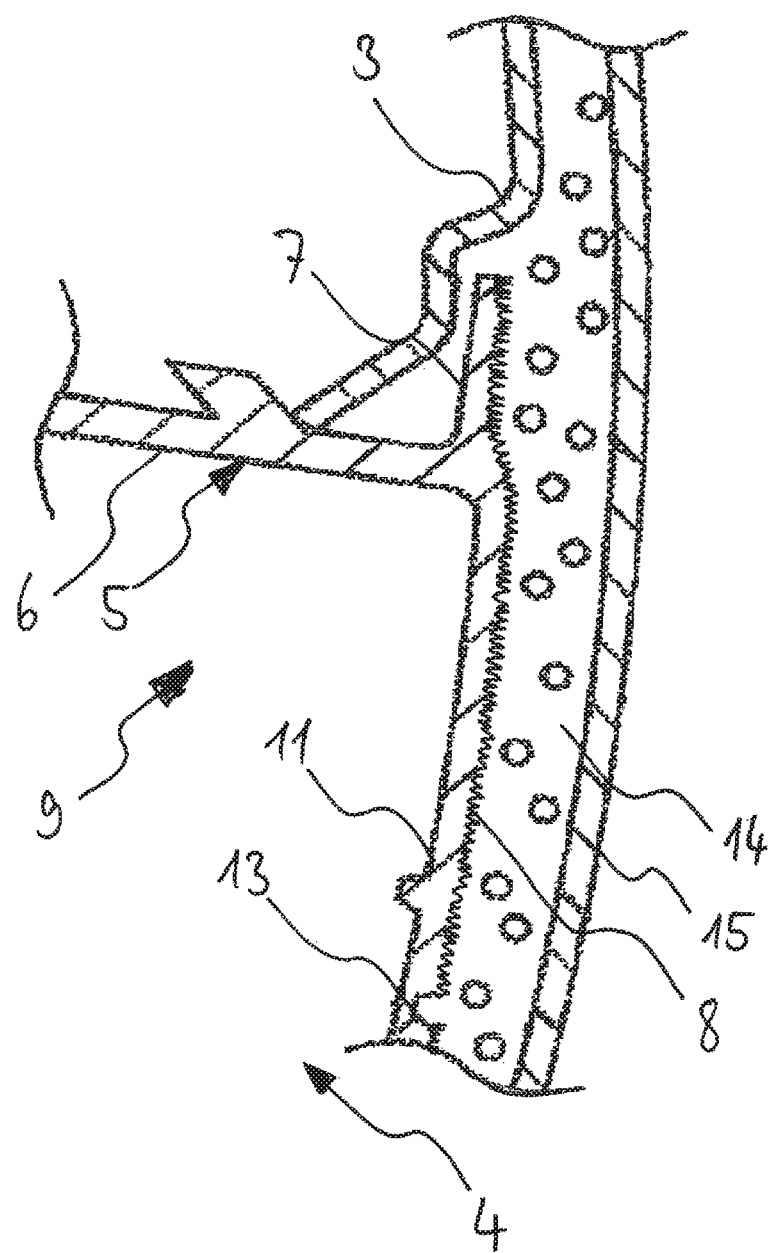
FIG. 2 is an enlarged view of a detail of embodiments depicted in FIG. 1.

A dotted box 24 in FIG. 1 indicates the area of a detail depicted in FIG. 2. The features shown in FIG. 2 are denoted using the same numerals as in FIG. 1. The cover plate 7 of the chute channel assembly 5 is shown to cover the opening 4 in the substrate 3. The foam layer 14 and the surface skin 15 cover the substrate 3 and the cover plate 7, so that the foam layer 14 is in contact with the substrate 3 and the cover plate 7. The chute channel assembly 5 can be manufactured by injection molding using a mold, which is roughened by sand blasting or etching prior to the molding process. The material used for manufacturing the chute channel assembly 5 is a thermoplastic resin such as polypropylene or polyethylene or a copolymer thereof, containing EPDM as an additive. As a consequence of the roughness of the mold, the outer surface 8 of the cover plate 7 has a rough surface as shown in FIG. 2. After manufacturing of the chute channel assembly 5, the outer surface 8 can be flamed to increase its surface tension. During the manufacturing of the vehicle interior panel 1, the substrate 3 and the chute channel assembly 5 are placed in a second mold together with the surface skin 15. Then, the foam layer 14 is injected into the second mold. Due to the rough surface structure of the outer surface 8, an area of contact between the outer surface 8 and the foam layer 14 is increased. A surface roughness parameter $R_a$ of the outer surface 8 can be 8 μm, while a rough surface structure of the outer surface has a maximal amplitude of 400 μm and a mean spacing between peaks of 200 μm.

We claim:

1. A vehicle interior panel for covering an airbag, comprising:
a substrate with an opening;
a chute channel assembly inserted into the opening;
a surface skin; and
a foam layer disposed between the surface skin and the substrate,
wherein the chute channel assembly comprises a wall section surrounding a chute channel for the airbag and a cover plate covering the chute channel and closing the opening, the cover plate comprising an airbag door, wherein an outer surface of the cover plate is in direct contact with the foam layer, characterized in that the outer surface of the cover plate has a rough surface structure that covers all of an outer surface of the airbag door, the outer surface of the cover plate having a surface roughness parameter $R_a$ of at least 4 µm.

2. The vehicle interior panel of claim 1, wherein the chute channel assembly is a one-piece injection molded part.

3. The vehicle interior panel of claim 1, wherein the chute channel assembly is made of a material containing at least one of polypropylene, polyethylene, a copolymer containing propylene, and ethylene units.

4. The vehicle interior panel of claim 1, wherein the chute channel assembly is made of a material containing EPDM as an additive.

5. The vehicle interior panel of claim 1, wherein the surface roughness parameter $R_a$ of the outer surface of the cover plate is one or more of at least 6 µm and at most 13 µm.

6. The vehicle interior panel of claim 1, wherein the rough surface structure of the outer surface of the cover plate has one or more of a maximal amplitude of at least 300 µm and a maximal amplitude of at most 700 µm.

7. The vehicle interior panel of claim 1, wherein the outer surface of the cover plate has a mean spacing between peaks of the rough surface structure of one or more of at least 100 µm and at most 800 µm.

8. The vehicle interior panel of claim 1, wherein the foam layer is made of polyurethane.

9. A method for manufacturing a vehicle interior panel for covering an airbag, comprising the steps of:

providing a first mold with an interior surface;
roughening the interior surface to form a rough surface structure;
manufacturing a chute channel assembly comprising a wall section surrounding a chute channel and a cover plate covering the chute channel by injection molding using the first mold, wherein the rough surface structure of the interior surface of the mold forms a rough surface structure of an outer surface of the cover plate;
providing a pre-molded substrate with an opening;
inserting the chute channel assembly into the opening so that the cover plate closes the opening;
placing a surface skin and the substrate with the chute channel assembly in a second mold; and
injecting a foam material into the second mold to fill a space between the surface skin and the substrate with the chute channel assembly.

10. The method of claim 9, wherein the roughening of the interior surface is achieved by sand blasting or etching.

11. The method of claim 9, further comprising a step of flaming, wherein heat is applied to the outer surface of the cover plate prior to the injection of the foam material.

12. A use of the method of claim 9 for manufacturing the vehicle interior panel of claim 1.

\* \* \* \* \*